United States Patent
Wang et al.

(10) Patent No.: US 9,799,213 B1
(45) Date of Patent: Oct. 24, 2017

(54) GARAGE DOOR SWITCH CONTROL SYSTEM AND METHOD THEREOF

(71) Applicants: Ruizu (Ray) Wang, San Ramon, CA (US); Xiyun (Simon) Mao, San Jose, CA (US)

(72) Inventors: Ruizu (Ray) Wang, San Ramon, CA (US); Xiyun (Simon) Mao, San Jose, CA (US)

(73) Assignees: Ruizu (Ray) Wang, San Ramon, CA (US); Xiyun (Simon) Mao, San Jose, CA (US)

( * ) Notice: Subject to any disclaimer, the term of this patent is extended or adjusted under 35 U.S.C. 154(b) by 0 days.

(21) Appl. No.: 15/649,629

(22) Filed: Jul. 13, 2017

Related U.S. Application Data

(63) Continuation-in-part of application No. 14/829,677, filed on Aug. 19, 2015, now abandoned.

(60) Provisional application No. 62/038,836, filed on Aug. 19, 2014.

(51) Int. Cl.
*G08C 17/02* (2006.01)
*G07C 9/00* (2006.01)
*G01S 11/06* (2006.01)
*H04W 12/08* (2009.01)
*H04B 17/318* (2015.01)
*E04H 6/02* (2006.01)

(52) U.S. Cl.
CPC .............. *G08C 17/02* (2013.01); *G01S 11/06* (2013.01); *G07C 9/00007* (2013.01); *H04B 17/318* (2015.01); *H04W 12/08* (2013.01); *E04H 6/02* (2013.01); *G08C 2201/91* (2013.01)

(58) Field of Classification Search
CPC ..... G08C 17/02; H04B 17/318; G01S 5/0226; G01S 11/06; H04W 12/08; E04H 6/02
See application file for complete search history.

(56) References Cited

U.S. PATENT DOCUMENTS

| | | | |
|---|---|---|---|
| 2002/0086648 A1* | 7/2002 | Wilhelmsson | H04B 7/0814 455/101 |
| 2008/0106832 A1* | 5/2008 | Restrepo | H02H 1/0015 361/42 |
| 2008/0129461 A1* | 6/2008 | Abraham | G06K 7/0008 340/10.1 |
| 2008/0164973 A1* | 7/2008 | Mamaloukas | G07C 9/00309 340/5.7 |
| 2008/0169900 A1* | 7/2008 | Mullet | G07C 9/00309 340/5.71 |
| 2009/0156126 A1* | 6/2009 | Willis | G01S 5/0226 455/41.3 |
| 2010/0305779 A1* | 12/2010 | Hassan | G01C 17/38 701/2 |

(Continued)

*Primary Examiner* — Thomas Alunkal
(74) *Attorney, Agent, or Firm* — Guosheng Wang; United States Research and Patent Firm

(57) ABSTRACT

Provided is an intelligent garage door switch control system and method thereof. The system includes a transmitting radio frequency device, a receiving radio frequency device, and a control circuit for operating a switch. The control circuit is configured to use a predetermined pattern detected as the basis to operate the switch. The predetermined pattern includes a first acceleration from a speed of 0 to a speed greater than 0, a first deceleration from a speed greater than 0 down to a speed of 0 thereafter, and a second acceleration from a speed of 0 to a speed greater than 0 thereafter.

15 Claims, 5 Drawing Sheets

(56) References Cited

U.S. PATENT DOCUMENTS

2015/0048927 A1\* 2/2015 Simmons ........... G07C 9/00309
340/5.61

\* cited by examiner

GARAGE DOOR SWITCH CONTROL SYSTEM AND METHOD THEREOF

CROSS-REFERENCE TO RELATED U.S. APPLICATIONS

This application, is a CIP application of non-provisional patent application Ser. No. 14/829,677 filed Aug. 19, 2015, entitled "Switch Control System and Method Thereof", which claims priority to U.S. Provisional Patent Application No. 62/038,836, filed Aug. 19, 2014, entitled "Intelligent Automatic Garage Door Close/Open System"; and both applications are incorporated by reference to the extent not inconsistent with the present disclosure.

STATEMENT REGARDING FEDERALLY SPONSORED RESEARCH OR DEVELOPMENT

Not applicable

NAMES OF PARTIES TO A JOINT RESEARCH AGREEMENT

Not applicable.

REFERENCE TO AN APPENDIX SUBMITTED ON COMPACT DISC

Not applicable

FIELD OF THE INVENTION

The present invention relates generally to an intelligent garage door switch control system and method, thereof.

BACKGROUND OF THE INVENTION

Up to 50% of all residential burglaries are caused by an open garage door. Despite that people can push a button on a remote control to close the garage door, every day people are asking themselves the nagging question "did I forget to close my garage door?" This is simply because many times the driver cannot see, or visually confirm, the garage door is closed or is closing.

To solve the problem, a known solution is to send an alert to the driver warning the garage door has been left open. However, such solution relies on that the driver takes an extra action to close the door. First, taking extra action is not convenient for the driver while he/she is driving. Second, even when the action is taken, sometimes the driver may be already in a position where the door is not within his/her sight. Therefore, the uncertainty on whether the garage door is actually closed or not will make the driver feel mental uneasiness or nervousness, and the driver cannot enjoy a peace of mind afterwards.

In a number of wireless communication technologies, such as Cellular, WLAN, Bluetooth, ZigBee, etc., Received Signal Strength Indicator (RSSI) has been used to measure the distance and control the door switch. However, the solution is also far from satisfactory, since the door does not close in an intelligent way. For example, the door may not start to close while the door is still visible to a leaving driver.

Advantageously, the present invention can overcome the afore-mentioned problems, by providing an intelligent switch control system and method thereof.

SUMMARY OF THE INVENTION

One aspect of the invention provides a garage door switch control system as exemplified in FIGS. 1 and 2. The system includes a transmitting, radio frequency device placed in a car in a garage having a door, a receiving radio frequency device placed in the garage, a control circuit in the garage, and an actuator in the garage for operating a switch. The control circuit is configured to (i) measure a distance between the transmitting radio frequency device and the receiving radio frequency device; (ii) measure a speed of a relative movement between the transmitting radio frequency device and the receiving radio frequency device; and (iii) generate a signal immediately after a pattern is detected, wherein the pattern includes a first acceleration from a speed of 0 to a speed greater than 0, a first deceleration from a speed greater than 0 down to a speed of 0 thereafter, and a second acceleration from a speed of 0 to a speed greater than 0 thereafter. The actuator actuates the switch to close the garage door in response to the signal.

Another aspect of the invention provides a method of operating a garage door switch as exemplified in FIGS. 1 and 2. The method includes (a) providing a transmitting radio frequency device in a car in a garage having a door and a receiving radio frequency device in the garage, (b) measuring a RSSI value of the transmitting radio frequency device relative to the receiving radio frequency device to calculate the distance therebetween, (c) providing a RSSI (t) function characterizing the variation of the RSSI value with respect to time t to calculate a speed of a relative movement between the transmitting radio frequency device and the receiving radio frequency device, (d) generating a signal immediately after a pattern is detected, wherein the pattern includes a first acceleration from a speed of 0 to a speed greater than 0, a first deceleration from a speed greater than 0 down to a speed of 0 thereafter, and a second acceleration from a speed of 0 to a speed greater than 0 thereafter; and (e) actuating the switch to close the garage door in response to the signal.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The present invention is illustrated by way of example, and not by way of limitation, in the figures of the accompanying drawings and in which like reference numerals refer to similar elements. For simplicity and clarity of illustration, elements shown in the Figures and discussed below have not necessarily been drawn to scale. Well-known structures and devices are shown in simplified form such as block diagrams in order to avoid unnecessarily obscuring the present invention.

DETAILED DESCRIPTION OF THE PREFERRED EMBODIMENTS

In the following description, for the purposes of explanation, numerous specific details are set forth in order to provide a thorough understanding of the present invention. It is apparent, however, to one skilled in the art that the present invention may be practiced without these specific details or with an equivalent arrangement.

FIGS. 1-5 schematically illustrate the following 15 embodiments:

Embodiment 1

A garage door switch control system comprising:
a transmitting radio frequency device placed in a car in a garage having a door,
a receiving radio frequency device placed in the garage,
a control circuit in the garage, and
an actuator in the garage for operating a switch,
wherein the control circuit is configured to
(i) measure a distance between the transmitting radio frequency device and the receiving radio frequency device;
(ii) measure a speed of a relative movement between the transmitting radio frequency device and the receiving radio frequency device, and
(iii) generate a signal immediately after a pattern is detected, wherein the pattern includes a first acceleration from a speed of 0 to a speed greater than 0, a first deceleration from a speed greater than 0 down to a speed of 0 thereafter, and a second acceleration from a speed of 0 to a speed greater than 0 thereafter;
wherein said actuator actuates the switch to close the garage door in response to the signal.

Embodiment 2

The garage door switch control system according to Embodiment 1, wherein the distance is generated or calculated from a RSSI value of the transmitting radio frequency device as measured by the receiving radio frequency device, and the speed is generated or calculated from a RSSI (t) function characterizing variation of the RSSI value with respect to time t.

Embodiment 3

Figure 2:
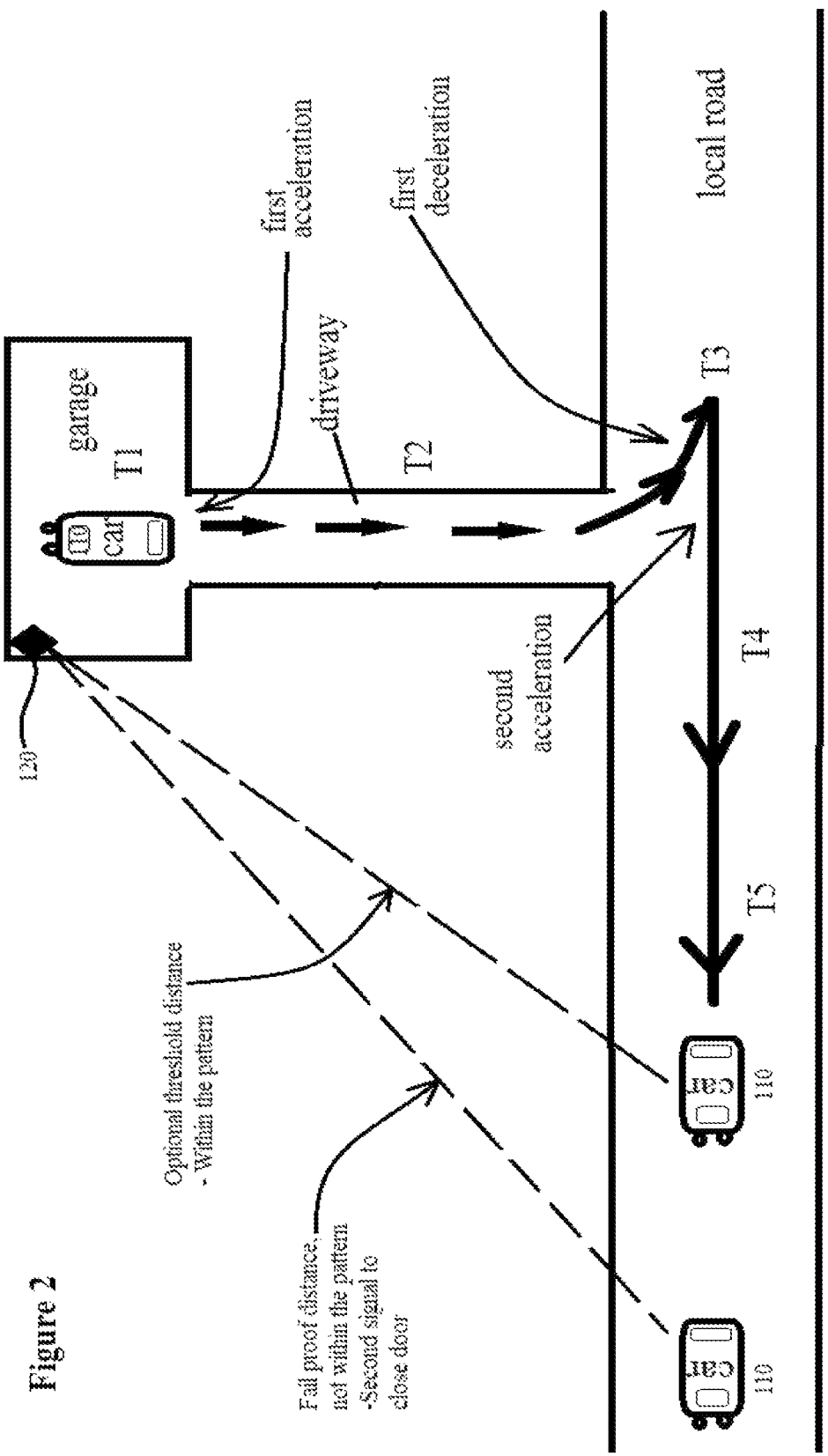
FIG. 2 is the schematic illustration of a scenario that a car is leaving a garage, wherein the system and method of the invention can find an application.
Figure 3:
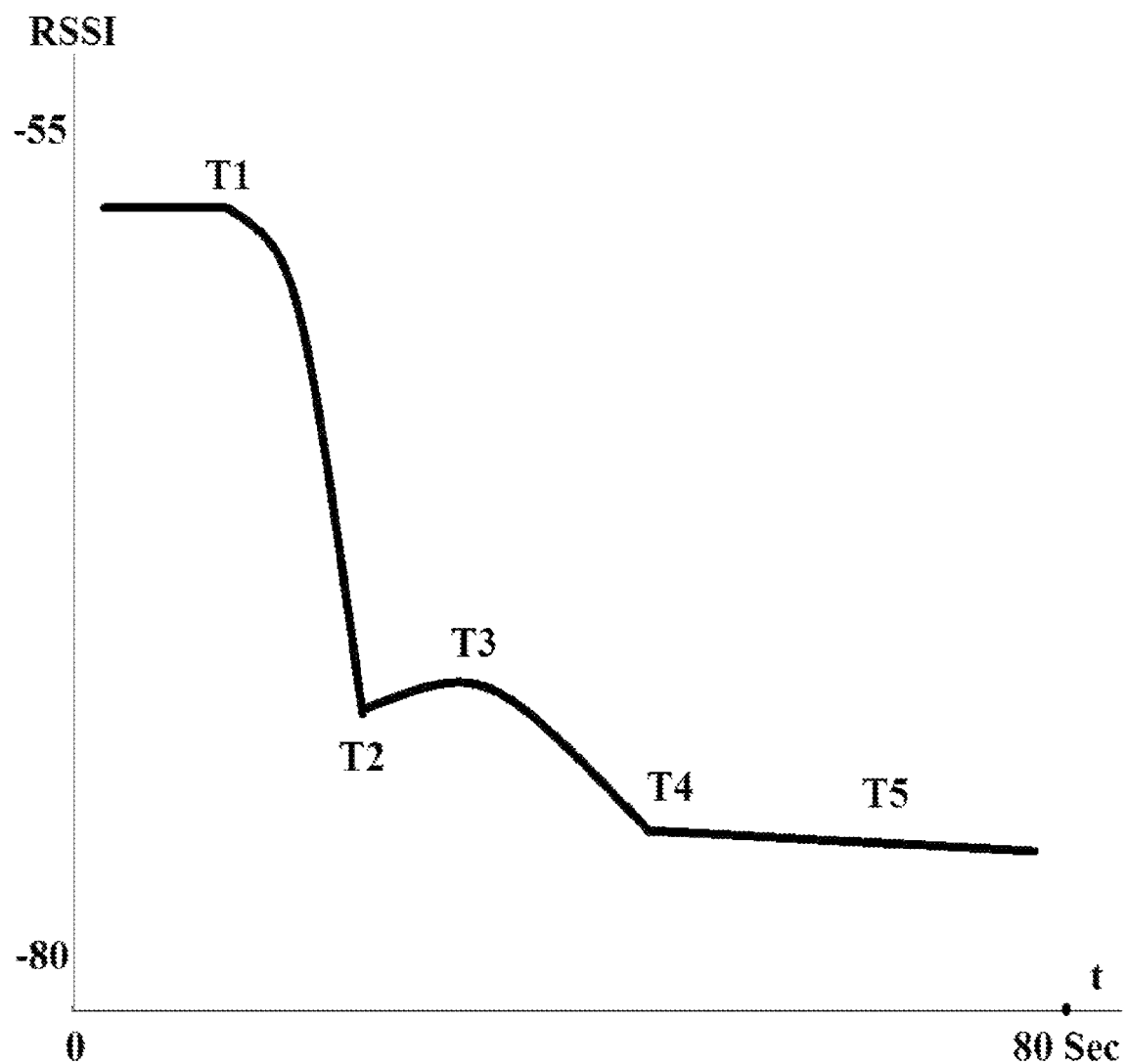
FIG. 3 schematically shows the curve of function RSSI (t) as measured in the scenario of FIG. 2.

The garage door switch control system according to Embodiment 1, wherein said pattern includes a first acceleration from a speed of 0 to a speed greater than 0, a first deceleration from a speed greater than 0 down to a speed of 0 thereafter, a second acceleration from a speed of 0 to a speed greater than 0 thereafter, and a predetermined threshold distance thereafter, labeled as "Optional threshold distance—within the pattern" in FIG. 2.

Embodiment 4

The garage door switch control system according to Embodiment 1, wherein the control circuit is further configured to: (iv) generate a second signal when said distance is greater than a predetermined fail proof distance (labeled as "Fail proof distance, not within the pattern—Second signal to close door" in FIG. 2) such as 50 yards, and 100 yards; and wherein said actuator actuates the switch to close the garage door again, or keep an already-closed door closed, in response to the second signal.

Embodiment 5

The garage door switch control system according to Embodiment 3, wherein the control circuit is further configured to: (iv) generate a second signal when said distance is greater than a predetermined fail proof distance (labeled as "Fail proof distance, not within the pattern—Second signal to close door" in FIG. 2) such as 50 yards, and 100 yards; and wherein said actuator actuates the switch to close the garage door again, or keep an already-closed door closed, in response to the second signal.

Embodiment 6

The garage door switch control system according to Embodiment 5, wherein the predetermined fail proof distance is greater than the predetermined threshold distance.

Embodiment 7

The garage door switch control system according to Embodiment 1, wherein said "immediately after" is 0.1 second after, 0.2 seconds after, 0.3 seconds after, 0.4 seconds after, 0.5 seconds after, or 1.0 second after.

Embodiment 8

The garage door switch control system according to Embodiment 1, wherein the control circuit is implemented based on hardware circuitry, software instruction, or any combination thereof.

Embodiment 9

A method of operating a garage door switch, comprising:
(a) providing a transmitting radio frequency device in a car in a garage having a door and a receiving radio frequency device in the garage;
(b) measuring a RSSI value of the transmitting radio frequency device relative to the receiving radio frequency device to calculate the distance therebetween;
(c) providing a RSSI (t) function characterizing the variation of the RSSI value with respect to time t to calculate a speed of a relative movement between the transmitting radio frequency device and the receiving radio frequency device;
(d) generating a signal immediately after a pattern is detected, wherein the pattern includes a first acceleration from a speed of 0 to a speed greater than 0, a first deceleration from a speed greater than 0 down to a speed of 0 thereafter, and a second acceleration from a speed of 0 to a speed greater than 0 thereafter; and
(e) actuating the switch to close the garage door in response to the signal.

Embodiment 10

The method according to Embodiment 9, further comprising a step of authenticating the transmitting radio frequency device with the receiving radio frequency device to establish a trusted relationship therebetween.

Embodiment 11

The method according to Embodiment 9, wherein said pattern includes a first acceleration from a speed of 0 to a speed greater than 0, a first deceleration from a speed greater than 0 down to a speed of 0 thereafter, a second acceleration from a speed of 0 to a speed greater than 0 thereafter, and a predetermined threshold distance thereafter, labeled as "Optional threshold distance—within the pattern" in FIG. 2.

Embodiment 12

The method according to Embodiment 9, further comprising generating a second signal when said distance is greater than a predetermined fail proof distance (labeled as "Fail proof distance, not within the pattern—Second signal to close door" in FIG. 2) such as 50 yards, and 100 yards; and wherein said actuator actuates the switch to close the garage door again, or keep an already-closed door closed, in response to the second signal.

Embodiment 13

The method according to Embodiment 11, further comprising generating a second signal when said distance is greater than a predetermined fail proof distance (labeled as "Fail proof distance, not within the pattern—Second signal to close door" in FIG. 2) such as 50 yards, and 100 yards, and wherein said actuator actuates the switch to close the garage door again, or keep an already-closed door closed, in response to the second signal.

Embodiment 14

The method according to Embodiment 13, wherein the predetermined fail proof distance is greater than the predetermined threshold distance.

Embodiment 15

The method according to Embodiment 9, wherein said "immediately after" is 0.1 second after, 0.2 seconds after, 0.3 seconds after, 0.4 seconds after, 0.5 seconds after, or 1.0 second after.

Figure 1:
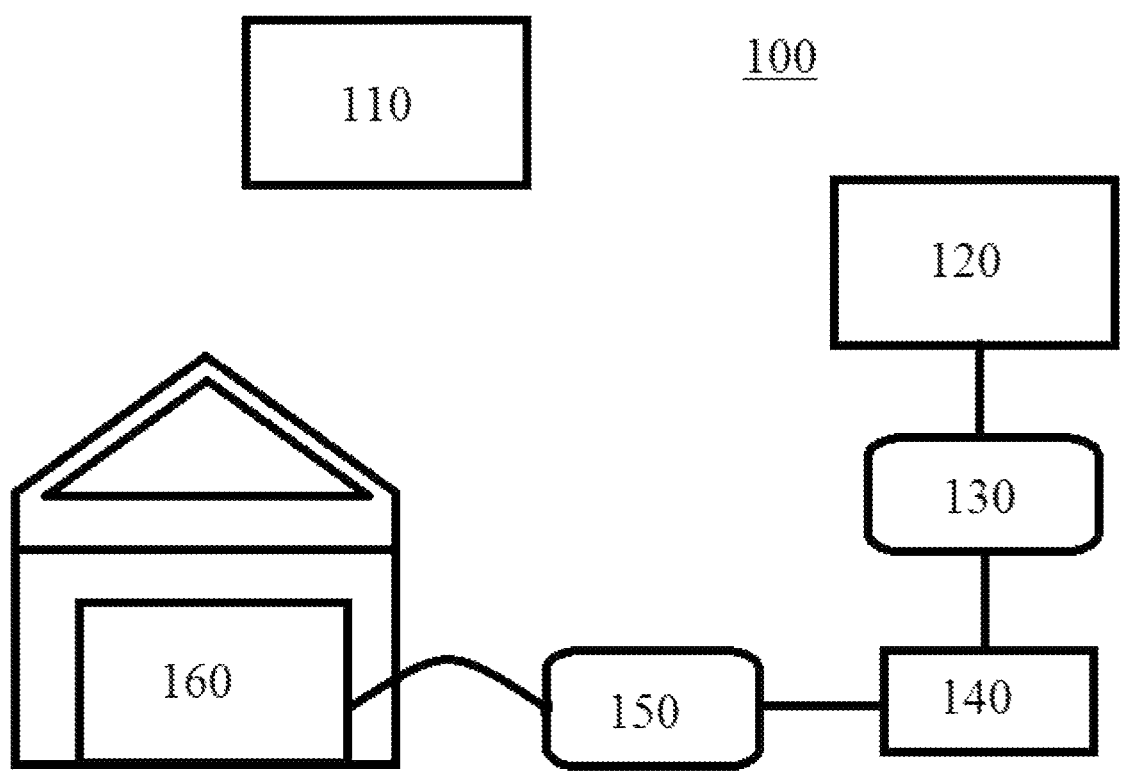
FIG. 1 schematically illustrates an embodiment of the garage door switch control system according to the present invention.

FIG. 1 schematically illustrates an embodiment of the garage door switch control system according to the present invention. The system 100 includes a transmitting radio frequency device 110 that can be installed in a movable object such as a car. Installed in a garage is a receiving radio frequency device 120, which can be operatively connected to a control circuit 130. Circuit 130 controls an actuator 140 for operating a switch 150 that governs, for example, the opening or closing of a door 160 such as a garage door and a security door.

Examples of device 110/120 include, but are not limited to, dedicated devices, mobile telephones/cellphones, car and portable radios, RFID readers and transmitters, laptops or other devices including a transmitting and/or receiving processor. For example, they can be paired Bluetooth devices. A radio frequency network monitoring tool can also be used to measure the signal strength e.g. RSSI value of a wireless network.

Devices 110 and 120 are capable of transmitting/receiving electromagnetic waves in the radio frequency (RF) spectrum, within the range of from about 3 kHz up to 300 GHz. For example, devices 110 and 120 can operate in the 2.4 GHz radio bands. The term "radio frequency" or its abbreviation "RF" is used herein to describe wireless communication between devices 110 and 120, as opposed to communication via electric wires.

In some embodiments, both device 110 and device 120 support a radio frequency communication method selected from the group consisting of Global System for Mobiles (GSM), Code Division Multiple Access (CDMA), Bluetooth, ZigBee, and Wi-Fi.

Control circuit 130 may be built based on hardware circuitry (e.g. an IC chip), software instruction, or any combination thereof. In various embodiments, control circuit 130 is configured or programmed to generate a RSSI (t) function characterizing the variation of the RSSI Value of the transmitting radio frequency device 110 as measured by the receiving radio frequency device 120, with respect to time t.

RSSI is a measure of the signal strength, not necessarily the quality, between transmitting and receiving devices 110 and 120 in a radio frequency environment. RSSI may be measured in arbitrary units. When transmitting messages between devices, RSSI value is a useful guide to the strength of the signal whether measured in Watts (W) or Decibels (dB). The value of RSSI measurements will vary depending on the implementation and the chosen scale, but is usually an integer value where a low value indicates a low signal strength. According, to the IEEE802.11 standard RSSI is intended to be used in a relative manner. Absolute accuracy of the RSSI reading is not specified.

RSSI value of the signal emitted from transmitting radio frequency device 110 and received by the receiving radio frequency device 120 is generally proportional to the inverse square of the distance (1/d2). In practice, the distance or proximity between devices 110 and 120 can be estimated or calculated based on measured RSSI value.

When devices 110 and 120 are approaching to each other, or retreating (moving away) from each other, a RSSI (t) function characterizing the variation of the RSSI value of device 110 as measured by device 120, with respect to time t, can be generated, recorded and analyzed. For example, the transmitting radio frequency device 110 emits signals periodically, i.e. in a predetermined time interval, and on the other hand, the receiving radio frequency device 120 receives the signals, so to establish a raw data set with two coordinates (RSSI, t). A RSSI (t) function may then be created based on the data set using known mathematical methods. In practice, noises or fluctuations in RSSI measurement are sometimes prevalent. The fluctuations may be caused by, for example, changes in distance, interference from external material such as wood or metal between the radio frequency devices 110 and 120, and environmental conditions etc. In preferred embodiments of the invention, the raw data is further processed or treated to reduce the noise level. As a result, the curve/graph of RSSI (t) function may appear smoother or more continuous. In exemplary embodiments of the invention, methods such as simple moving average and exponential moving average may be employed toward that end.

In simple moving average method, a history of RSSI readings is averaged over to reduce the size of the fluctuations. In general, the fluctuations can be reduced further by increasing the number of periods that signal strength is averaged over. However, the lower the number of periods, the more sensitive the RSSI detection will be.

In order to reduce the time lag in simple moving averages, exponential moving averages (also called exponentially weighted moving averages or EMAs) can be used instead EMAs reduce the lag by applying more weight to recent values relative to older values. The weighting applied to the most recent value depends on the specified period of the EMA. The shorter the EMA period, the more weight that will be applied to the most recent value. As such, EMAs will react quicker to recent changes than a simple moving average.

In various exemplary embodiments, control circuit 130 may be configured to differentiate so-obtained RSSI (t)

function to provide a first derivative function Fd1 (t) characterizing the variation rate (VR) of the RSSI value with respect to time t, or speed.

In single-variable calculus, differentiation and integration are the two fundamental operations. The process of finding a derivative is called differentiation, while the reverse process is called integration. The first derivative of function RSSI (t) is a measure of the rate at which the value of the function RSSI (t) changes with respect to the change of the variable t. If the graph of RSSI is plotted against time t, the derivative is the slope of this graph at each point. If RSSI (t) is a function that has a derivative at every point t for a period of time, then there is a function that sends the point t to the derivative of RSSI at t. This function is defined as the first derivative function Fd1 (t) according to the present invention.

The derivative Fd1 (t) of function RSSI (t) at a chosen input value t is the slope of the tangent line (instantaneous variation rate) to the graph of function RSSI (t) at that point. It therefore describes the best linear approximation of function RSSI (t) near that input value.

In various embodiments, control circuit 130 is configured to generate a signal when the variation rate (VR) exhibits a predetermined pattern, or exhibits a first predetermined pattern, if in the context or embodiments where two or more predetermined VR patterns are involved. Such interpretation of "first" and "second" applies to other applicable embodiments in the present invention.

With reference to FIG. 2, a garage is equipped with a receiving radio frequency device 120. The car parked in the garage is installed with a transmitting radio frequency device 110 (not shown). The car will move along the arrowed route as shown in FIG. 2. For simplicity, the car's location when t=Tx is abbreviated as location Tx in this writing. For example, location T2 and location T5 are intended to mean car's location when t=T2 and car's location when t=T5 In FIG. 2, the car moves backward from location T1 to T2 on the driveway, then to T3 on the local road. At location T3, the driver changes the car gear from reverse to forward, and then speeds up and drives away passing locations T4 and T5 on local road.

Referring to FIG. 2, when a leaving driver sits in the car and opens the garage door at t=T1, the generation of RSSI (t) function and Fd1 (t) function is initiated. The curve of RSSI (t) function, i.e., RSSI value change with respect to time variable t, is roughly illustrated in FIG. 3 (not to scale either). This curve can be translated into distance change with respect to time variable t (not shown). The curve of Fd1 (t) function, i.e., RSSI value variation rate (VR) with respect to time variable t, is roughly illustrated in FIG. 4 (not to scale). This curve can be translated into speed change with respect to time variable t (not shown).

Figure 4:
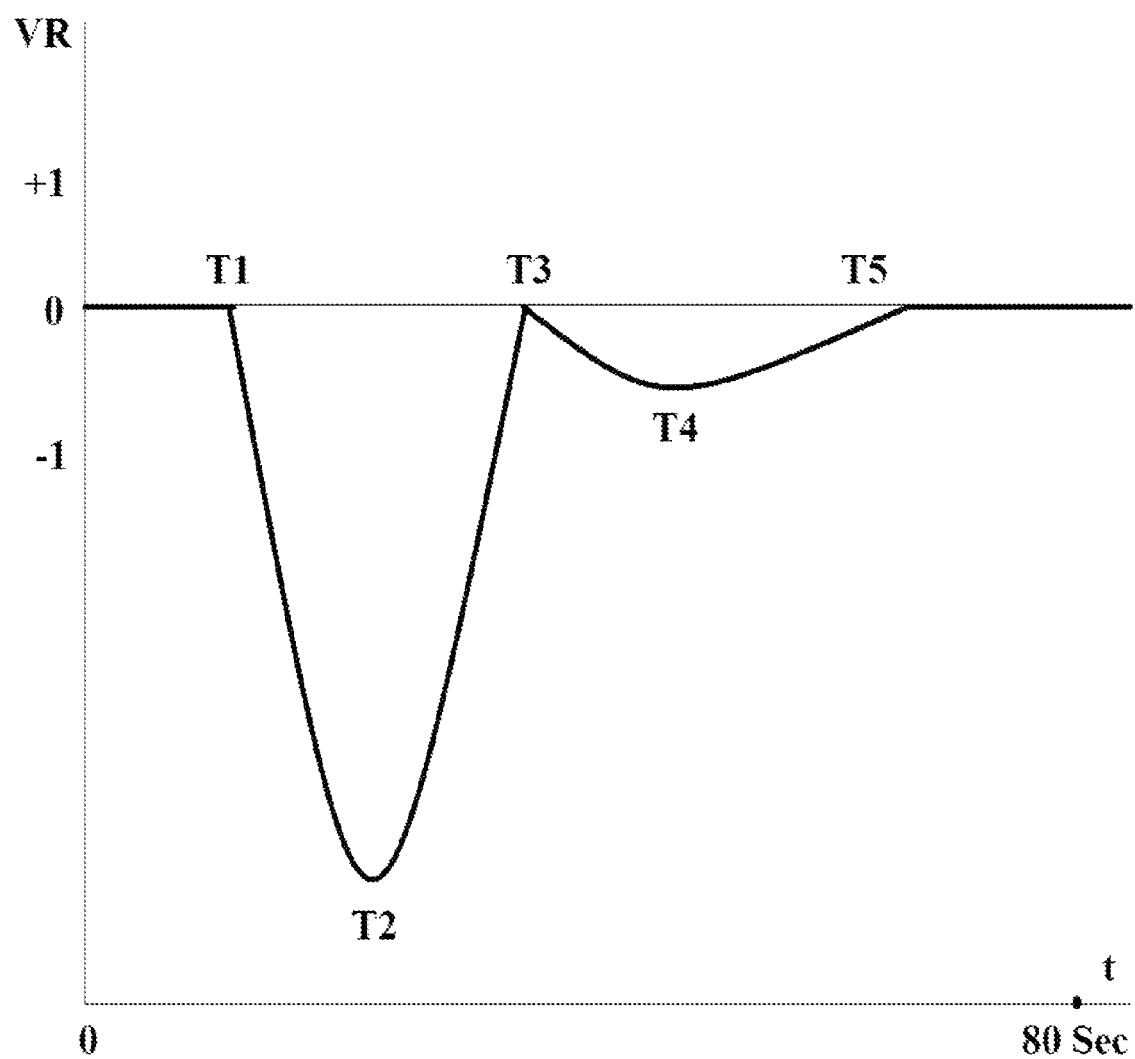
FIG. 4 schematically shows the curve of function Fd1 (t) as measured in the scenario of FIG. 2.

Referring to FIG. 4, VR substantially monotonously decreases from a first zero value at t=T1, down to a first valley value at t=T2, and then substantially monotonously increases to a second zero value at t=T3. The pattern from T1 to T3 is an example of the so-called "a predetermined pattern" or "a first predetermined pattern". Upon the appearance of such VR pattern, control circuit 130 (not shown in FIG. 3) as configured will generate a signal, in response to which actuator 140 (not shown in FIG. 3) will actuate switch 150 (not shown in FIG. 3) to close garage door 160 (not shown in FIG. 3). In other words, the car's speed exhibits such a pattern: a first acceleration from a speed of 0 at T1 to a speed greater than 0, a first deceleration from a speed greater than 0 down to a speed of 0 at T3, and a second acceleration from a speed of 0 at T3 to a speed greater than 0 (after T3). Once this pattern is detected, the actuator actuates the switch to close the garage door in response to the signal.

In mathematics, a monotonic function (or monotone function) is a function between ordered sets that preserves the given order. For example, a monotonically increasing function is strictly increasing within an area of interest. In the present invention, the term "substantially monotonously decreases' from T1 to T2 is however loosely defined as that, as a trend, VR is decreasing between T1 and T2. For example, if Δt=T2−T1 is about 15 seconds, a 0.5-second noise-like small "jump" or "peak" on the curve from T1 to T2 does not change the overall trend that VR substantially monotonously decreases from a first zero value at t=T1, down to a first valley value at t=T2.

In another group of embodiments, control circuit 130 is configured to generate a signal when, not only the variation rate (VR) has exhibited the predetermined pattern or the first predetermined pattern, but the measured RSSI value has also satisfied a first predetermined threshold distance, for example, 25 yards, 50 yards, and 100 yards etc. Therefore, the signal is generated upon two condition are met. Again using FIGS. 3 and 4 as representative examples, the first condition is the pattern between T1 and T3 as shown in FIG. 4, and as described above. The second condition is that the measured RSSI value has dropped below a first predetermined threshold, for example, distance >25 yards. Referring back to FIG. 3, a RSSI value at a time in the neighborhood of T3 can be preset as the first predetermined threshold. Other suitable RSSI value, such as the one between T2 and T3, or between T3 and T4, may alternatively be set as the first predetermined threshold. In some embodiments of the invention, RSSI value threshold may be established based on the concept of Schmitt trigger known to a skilled artisan in the field.

To ensure that the door is absolutely closed, a second signal or a failproof signal (when, for example, a threshold distance of 25 yards, 50 yards, and 100 yards etc is measured) may be generated and sent to the actuator to close the door or keep the already-closed door closed. The condition for the generation of the failproof signal may be a second predetermined Fd1 (t) pattern (or VR pattern), a second predetermined RSSI threshold, or any combination thereof. The conditions for generating the signal is summarized in Table 1 below for clarity.

TABLE 1

| # | Condition(s) to be met to generate the first signal |
| --- | --- |
| A1 | First predetermined VR pattern, or speed pattern |
| A2 | First predetermined VR pattern, or speed pattern, and First predetermined RSSI (or distance) threshold |

| # | Conditions to be met to generate the second (failproof) signal |
| --- | --- |
| B1 | First predetermined VR pattern, or speed pattern, and Second predetermined VR pattern, or speed pattern First predetermined VR pattern, or speed pattern, |
| B2 | First predetermined RSSI (or distance) threshold, and Second predetermined VR pattern, or speed pattern. |
| B3 | First predetermined VR pattern, or speed pattern, and Second predetermined RSSI (or distance) threshold First predetermined VR pattern, or speed pattern, |
| B4 | First predetermined RSSI (or distance) threshold, and Second predetermined RSSI (or distance) threshold First predetermined VR pattern, or speed pattern, |
| B5 | First predetermined RSSI (or distance) threshold, Second predetermined VR pattern, or speed pattern, and Second predetermined RSSI (or distance) threshold |

Referring back to FIG. 3, a RSSI value at a time in the neighborhood of T4 or T5 can be preset as the second predetermined RSSI threshold. Other suitable RSSI value, such as the one between T4 and T5, or beyond T5, may alternatively be set as the second predetermined RSSI threshold. In various embodiments, the absolute value of the first predetermined RSSI threshold is significantly higher than that of the second predetermined RSSI threshold.

Referring back to FIG. 4, the second predetermined VR pattern may be defined as that the variation rate (VR) decreases from the second zero value (at T3) down to a second valley value (at T4), and then increases back toward zero line (at T5). In various embodiments, the absolute value of the first valley value may be at least 2-10 such as 3, 5, or 7 times higher than that of the second valley value.

In various embodiments, the actuator 140 in FIG. 1 actuates the switch 150 in response to the signal to, for example, close or open a door 160. A switch directly or indirectly changes a device from one state to another. By way of example, a switch may change the state of a lock from locked to unlocked, or of an electronic device from on to off, or trigger an action in a program. The switch may be operable to perform, directly or indirectly, various operations, including without limitation, an electrical or software switch turning, a device or product on or off, opening or closing a door, releasing a catch, locking or unlocking a door or window or the like. For example, the switch may be used to trigger another software application for application to other location-based services such as mapping a device location, asset tracking, routing, proximity based messaging, including guides, advertising, ticketing, security and safety.

Those skilled in the art will appreciate that the invention is useable in a wide range of applications. Without wishing to limit the possible uses of the invention, examples of where the core invention may be used include home automation systems, access control systems, gates, garages, vehicles, electronic consumer devices, security and alarm systems.

The configuration of control circuit 130 of the present invention can be customized to different application environments. The customization depends on many factors such as landscape, driveway length, driver's habit, RF wavelength, transmitter power, receiver quality, type, size, and height of antenna, mode of transmission, noise, and interfering signals.

Components 120, 130, 140 and 150 in FIG. 1 can be combined or arranged in any convenient physical form, and can be operatively connected to each other in a wireless manner, wired manner, and any combination thereof. For example, control circuit 130 can be conveniently, and therefore preferably, installed in, or integrated into, receiving radio frequency device 120, although it can also be installed in, or integrated into, transmitting radio frequency device 110. System 100 can work with any traditional switch mechanisms in controlling a door such as a garage door. FIG. 11 shows an exemplary implementation of the switch control system according to the present invention.

Figure 5:
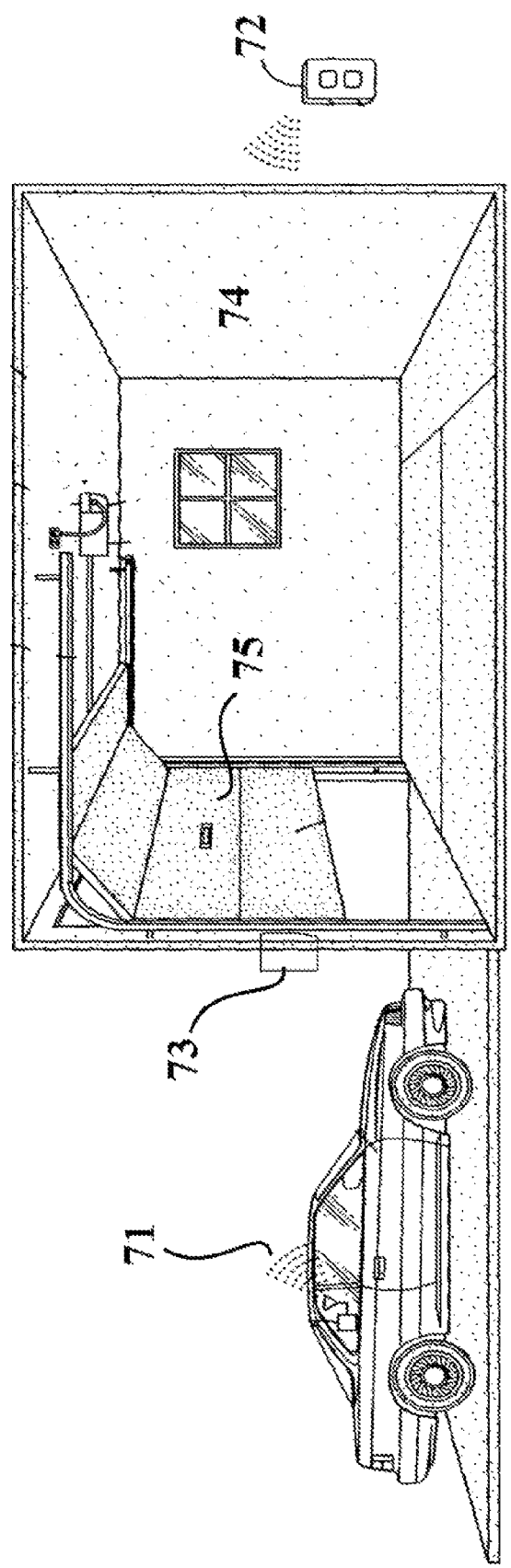
FIG. 5 shows an exemplary implementation of the switch control system according to the present invention.

With respect to FIG. 5, by adding three wireless devices to the existing garage door opener, car pulling out of garage 74 can be detected by searching for the following patterns: (1) The garage door is at the open position (by wireless device 73); (2) A continuous RSSI dropping trend is observed (by wireless device 72 recording RSSI from wireless device 71 shown in FIG. 11); (3) RSSI slope (VR) exceeds a predefined threshold; and (4) RSSI has dropped below a predefined level or died for a predefined period of time. Upon the detection of "car pulling out of garage.", the system will initiate the "closing garage door 75" action by device 72 sending the "push button" signal to the existing garage door opener.

Opposite to the above logic, this invention detects "car approaching to garage" by searching for the following patterns: (1) The garage door is at the closed position by device 73; (2) RSSI from device 71 is observed and increasing trend is recorded by device 72; and (3) RSSI slope exceeds a predefined threshold. Upon the detection of "car approaching to garage", the system will initiate the "opening garage door" action by device 72 sending the "push button" signal to the existing garage door opener. The system of the invention can therefore intelligently detect that the car is pulling out of the garage, and automatically closes the garage door upon sensing the car is leaving home. If the owner just parks the car on the driveway, the garage door will be left as is. On the other hands, the system can also intelligently detect the approaching of the owner's car, and open the garage door upon sensing the car's arrival.

In some embodiments, control circuit 130 can be a specialized microcontroller designed specifically for controlling the switch. Alternatively, control circuit 130 can be a standard personal computer device such as an Intel processor-based PC running an off the shelf operating system such as Windows, Linux, MacOS, or the like. In some embodiments, control circuit 130 can include direct hardware interface such as a USB port, an RS232 interface, and IP network interface (wired or wireless), or some other type of connection, to load software to control the components and functions of the system. In some embodiments, control circuit 130 can interface with a touch-screen user interface that enables the user to set the parameters for automated control of the different components. In some embodiments, control circuit 130 can include software that allows the user to enter parameters for controlling the switch. In some other embodiments, the software allows the user to program the system and method of the invention.

Having thus described various illustrative embodiments of the present invention and some of its advantages and optional features, it will be apparent that such embodiments are presented by way of example only and are not by way of limitation Those skilled in the art could readily devise alternations and improvements on these embodiments, as well as additional embodiments, without departing from the spirit and scope of the invention. All such modifications are within the scope of the invention as claimed.

The invention claimed is:

1. A garage door switch control system comprising:
   a transmitting radio frequency device placed in a car in a garage having a door,
   a receiving radio frequency device placed in the garage,
   a control circuit in the garage, and
   an actuator in the garage for operating a switch,
   wherein the control circuit is configured to
   (i) measure a distance between the transmitting radio frequency device and the receiving radio frequency device;
   (ii) measure a speed of a relative movement between the transmitting radio frequency device and the receiving radio frequency device, and
   (iii) generate a signal immediately after a pattern is detected, wherein the pattern includes a first acceleration from a speed of 0 to a speed greater than 0, a first deceleration from a speed greater than 0 down to a speed of 0 thereafter, and a second acceleration from a speed of 0 to a speed greater than 0 thereafter;

wherein said actuator actuates the switch to close the garage door in response to the signal.

2. The garage door switch control system according to claim 1, wherein the distance is generated or calculated from a RSSI value of the transmitting radio frequency device as measured by the receiving radio frequency device, and the speed is generated or calculated from a RSSI (t) function characterizing variation of the RSSI value with respect to time t.

3. The garage door switch control system according to claim 1, wherein said pattern includes a first acceleration from a speed of 0 to a speed greater than 0, a first deceleration from a speed greater than 0 down to a speed of 0 thereafter, a second acceleration from a speed of 0 to a speed greater than 0 thereafter, and a predetermined threshold distance thereafter.

4. The garage door switch control system according to claim 1, wherein the control circuit is further configured to: (iv) generate a second signal when said distance is greater than a predetermined fail proof distance such as 50 yards, and 100 yards; and wherein said actuator actuates the switch to close the garage door again, or keep an already-closed door closed, in response to the second signal.

5. The garage door switch control system according to claim 3, wherein the control circuit is further configured to: (iv) generate a second signal when said distance is greater than a predetermined fail proof distance such as 50 yards, and 100 yards; and wherein said actuator actuates the switch to close the garage door again, or keep an already-closed door closed, in response to the second signal.

6. The garage door switch control system according to claim 5, wherein the predetermined fail proof distance is greater than the predetermined threshold distance.

7. The garage door switch control system according to claim 1, wherein said "immediately after" is 0.1 second after, 0.2 seconds after, 0.3 seconds after, 0.4 seconds after, 0.5 seconds after, or 1.0 second after.

8. The garage door switch control system according to claim 1, wherein the control circuit is implemented based on hardware circuitry, software instruction, or any combination thereof.

9. A method of operating a garage door switch, comprising:
(a) providing a transmitting radio frequency device in a car in a garage having a door and a receiving radio frequency device in the garage;
(b) measuring a RSSI value of the transmitting radio frequency device relative to the receiving radio frequency device to calculate the distance therebetween;
(c) providing a RSSI (t) function characterizing the variation of the RSSI value with respect to time t to calculate a speed of a relative movement between the transmitting radio frequency device and the receiving radio frequency device;
(d) generating a signal immediately after a pattern is detected, wherein the pattern includes a first acceleration from a speed of 0 to a speed greater than 0, a first deceleration from a speed greater than 0 down to a speed of 0 thereafter, and a second acceleration from a speed of 0 to a speed greater than 0 thereafter; and
(e) actuating the switch to close the garage door in response to the signal.

10. The method according to claim 9, further comprising a step of authenticating the transmitting radio frequency device with the receiving radio frequency device to establish a trusted relationship therebetween.

11. The method according to claim 9, wherein said pattern includes a first acceleration from a speed of 0 to a speed greater than 0, a first deceleration from a speed greater than 0 down to a speed of 0 thereafter, a second acceleration from a speed of 0 to a speed greater than 0 thereafter, and a predetermined threshold distance thereafter.

12. The method according to claim 9, further comprising generating a second signal when said distance is greater than a predetermined fail proof distance such as 50 yards, and 100 yards; and wherein said actuator actuates the switch to close the garage door again, or keep an already-closed door closed, in response to the second signal.

13. The method according to claim 11, further comprising generating a second signal when said distance is greater than a predetermined fail proof distance such as 50 yards, and 100 yards; and wherein, said actuator actuates the switch to close the garage door again, or keep an already-closed door closed, in response to the second signal.

14. The method according to claim 13, wherein the predetermined fail proof distance is greater than the predetermined threshold distance.

15. The method according to claim 9, wherein said "immediately after" is 0.1 second after, 0.2 seconds after, 0.3 seconds after, 0.4 seconds after, 0.5 seconds after, or 1.0 second after.

* * * * *